United States Patent [19]

Dodson

[11] 3,714,461

[45] Jan. 30, 1973

[54] GENERATION OF MULTILEVEL DIGITAL WAVEFORMS

[75] Inventor: Arthur Edward Dodson, Ottawa, Ontario, Canada

[73] Assignee: Bell Canada-Northern Electric Research Limited, Ottawa, Ontario, Canada

[22] Filed: Nov. 5, 1971

[21] Appl. No.: 196,019

[52] U.S. Cl. ....................307/227, 307/260, 328/61, 328/186

[51] Int. Cl. ..........................................H03k 3/00

[58] Field of Search......................307/227, 243, 260; 328/59–61, 186

[56] References Cited

UNITED STATES PATENTS

| | | | |
|---|---|---|---|
| 3,356,956 | 12/1967 | Willard | 307/227 X |
| 3,124,707 | 3/1964 | Thomasson | 307/227 |
| 3,659,048 | 4/1972 | Zuerblis et al. | 307/227 X |
| 3,292,150 | 12/1966 | Wood | 307/243 X |
| 3,335,293 | 8/1967 | Horgan | 307/227 X |
| 3,500,215 | 3/1970 | Leuthold et al. | 328/61 |
| 3,521,185 | 7/1970 | Ley | 331/78 |
| 3,651,338 | 3/1972 | Swan, Jr. et al. | 307/227 |
| 3,657,657 | 4/1972 | Jefferson | 307/227 X |
| 3,659,207 | 10/1969 | Perreault | 328/14 |

*Primary Examiner*—Stanley D. Miller, Jr.
*Attorney*—John E. Mowle

[57] ABSTRACT

A circuit is disclosed for the generation of multi-level digital waveforms. The basic circuit, with some additions, is also capable of generating two or more of such waveforms, which have determinable phase relationships.

2 Claims, 2 Drawing Figures

PATENTED JAN 30 1973 3,714,461

SHEET 1 OF 2

Fig. I

GENERATION OF MULTILEVEL DIGITAL WAVEFORMS

FIELD OF THE INVENTION

This invention relates to the generation of multilevel digital waveforms.

BACKGROUND OF THE INVENTION

Multilevel digital waveforms and digitally or stepwise approximated analog waveforms are required for applications in various modern electrical/electronic technologies. They have the advantage of being suitable for generation by, and implementation in, digital devices and equipment, where the precision of digital processes and processors is a desirable characteristic.

For example, the emerging technology of magnetic bubble devices utilizes tiny, cylindrical magnetized domains formed in a substrate of magnetic material, to perform logic operations. (For a general explanation of the new technology see Telesis, Technical Journal of Bell-Northern Research Volume 2, No. 1, 1971, page 8. ) The control and movement of such magnetic domains is often accomplished by creating a rotating magnetic field in the plane of the substrate. To enable precise control of the position of the magnetic domains, a field that is rotating in well defined steps rather than continuously, is most suitable. Such a field may be provided by arranging two coils with their axes and planes at right angles and driving them with two stepwise approximated sinewaves 90° out of phase.

SUMMARY OF THE INVENTION

The present invention provides a digital circuit for generating multilevel digital waveforms and for digitally approximating (in steps) a given analog waveform with a desired accuracy. With expanded apparatus in accordance with the invention, two or more digital waveforms may be generated having certain determinable phase relationships to one another. The relative phases are determinable in multiples of one digital approximation step which is the smallest phase angle defined.

Thus, in accordance with the present invention, a circuit for generating a multilevel digital waveform comprises: a shift register, or the like, clock means for sequentially advancing the state of the shift register, means for decoding a plurality of the states of the shift register, and switching means responsive to the decoding means for controlling circuit elements to vary the value of a voltage and/or a current in an electrical circuit. The voltage and/or current, thus varied, substantially yields the desired digital waveform.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
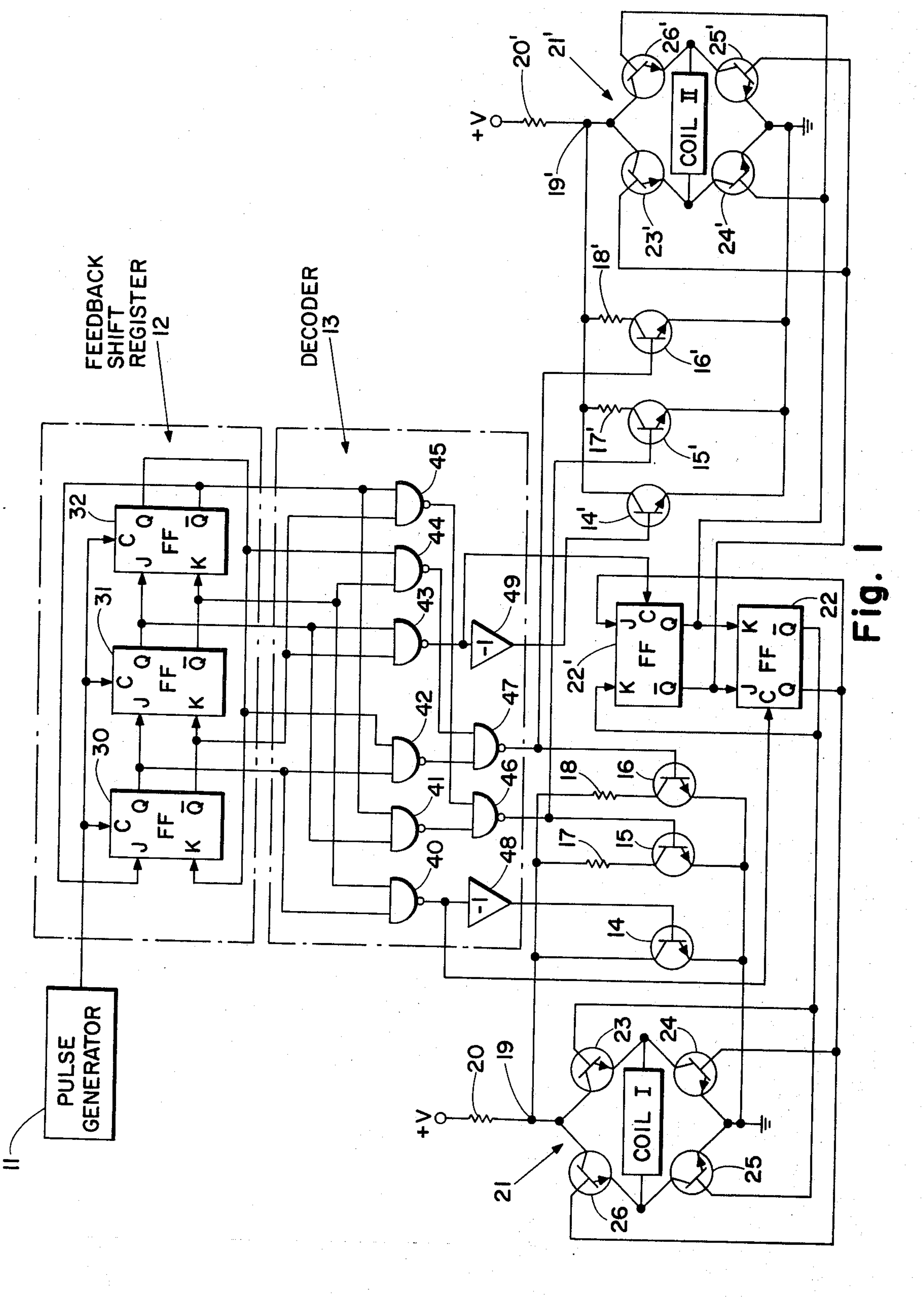
FIG. 1 is a block and schematic diagram of a circuit for generating digital waveforms according to this invention.
Figure 2:
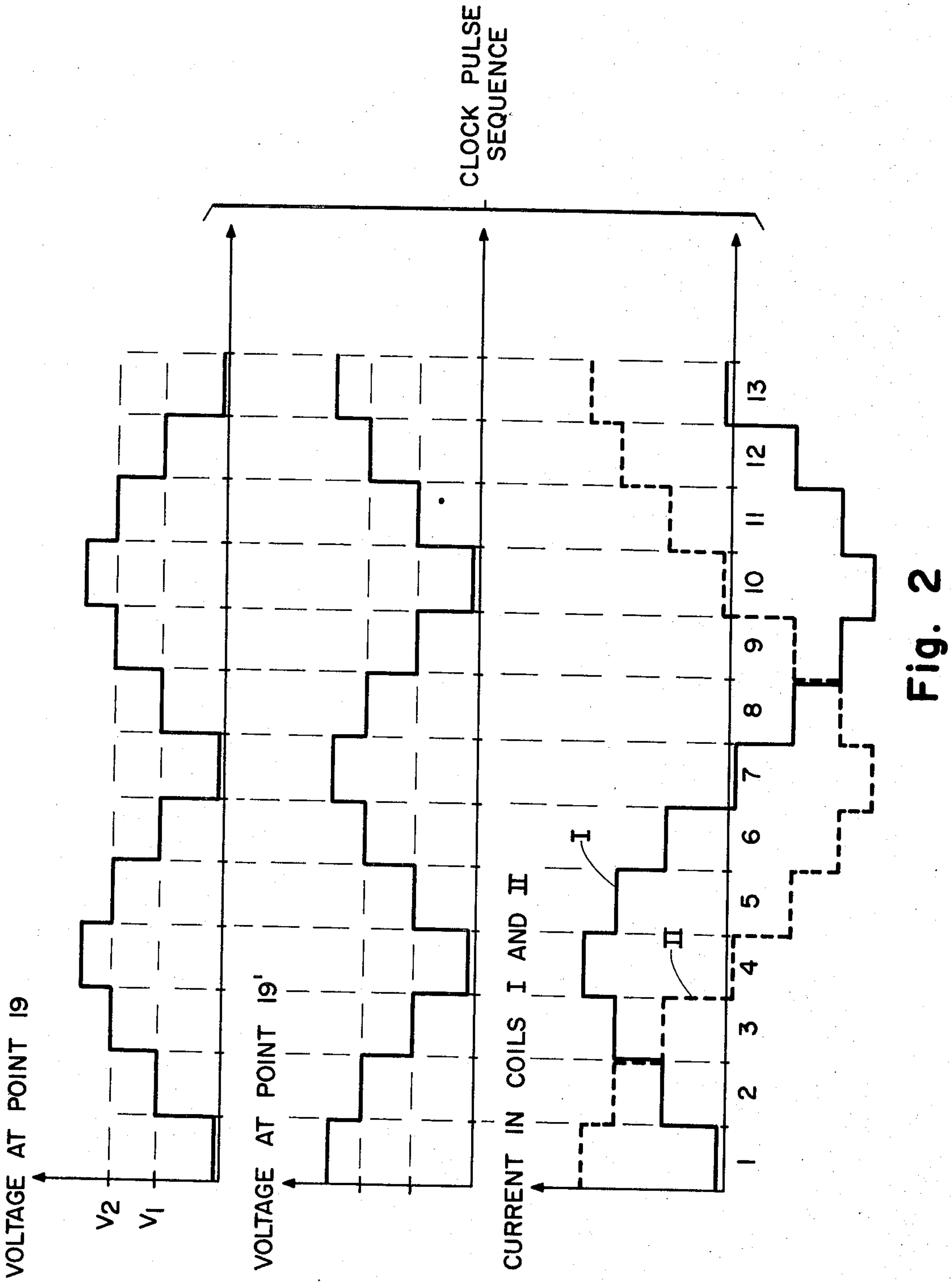
FIG. 2 depicts the waveforms resulting from the circuit of FIG. 1 and the resultant currents in two utilization loads, all in correct relative phase positions.

With reference to FIG. 1 and FIG. 2, a circuit and its operation for generating two digitally approximated 90° out of phase sinewaves will be described. The circuit shown in FIG. 1 comprises a pulse generator 11 driving a feedback shift register 12, the states of the latter being decoded by a decoder 13. A plurality of switching transistors 14 to 16 and 14' to 16' are responsive to the outputs of the decoder 13.

The transistors 15 and 16 control the connection of one side of each resistors 17 and 18, respectively, to ground. The other sides of resistors 17 and 18 are connected to a common junction point 19 which itself is connected to the supply voltage +V through a resistor 20. The transistor 14, through the connection of its collector to the point 19, controls the connection of the point 19 to ground. The point 19 is also connected to one corner of a transistor bridge 21 comprising four transistors 23, 24, 25 and 26. The opposite corner of the bridge 21 is grounded. Between the two remaining corners of the bridge 21, there is connected a first utilization load, which is coil I.

A second utilization load, which is coil II, is connected in the same manner to another transistor bridge 21'. In general, all the primed components from 14' to 26' inclusive, designate components of a similar function to that of the unprimed components 14 to 26 inclusive. The components designated with primed numerals will be specifically mentioned only when differences exist.

This embodiment was constructed to drive coils I and II (such a coil is often called Helmholtz coil) which are arranged with their axes and planes perpendicular in order to produce a rotating magnetic field in the plane of their axes, when driven by two currents 90° out of phase.

Now the operation of the embodiment will be described with reference to FIGS. 1 and 2. Shown in the uppermost portion of FIG. 2 is the generated waveform at point 19. Each cycle of this waveform consists of six digital steps. Within such cycle, two steps (the second and sixth) have the same voltage value $V_1$, and further two steps (the third and fifth) have the value $V_2$. The first step has substantially zero voltage, and the fourth has the maximum voltage.

The pulse generator 11 supplies a constant pulse train to clock the feedback shift register 12 and vary its state sequentially. The shift register 12 comprises the three stages 30, 31 and 32, each stage being a J-K flip flop. The Q-output of the stage 30 is coupled to the J-input of the stage 31, and the $\bar{Q}$-output to the K-input. The stage 31 is coupled similarly to the stage 32. The output of the stage 32, however, is fed back to the stage 30 in a reverse manner, i.e., the Q-output of the stage 32 is coupled the K-input of the stage 30, and the $\bar{Q}$-output to the J-input. Assuming the shift register 12 starts from an initial condition where all Q-outputs are in the logical "o" state (all $\bar{Q}$-outputs are in logical "1" ), upon switching on the pulse generator 11, the first clock pulse will cause the Q-output of the stage 30 to change from "o" to "1", and therefore the $\bar{Q}$-output from "1" to "o". The second clock pulse causes the stage 31 to change the states of its outputs similarly and the third clock pulse will finally cause the stage 32 to do the same. The fourth clock pulse will cause the state of the stage 30 outputs to change again, Q to "0" and $\bar{Q}$ to "1". These states propagate successively down the chain to the stage 32. The result is a state sequence of each of the stages 30, 31 and 32 of the register 11 as follows:

Q — 0 0 0 1 1 1 0 0 0 1 1 1 0 0 0 1 1 1
$\bar{Q}$ — 1 1 1 0 0 0 1 1 1 0 0 0 1 1 1 0 0 0

The repetition cycle of the above sequence is six steps, equal that of the generated waveform at point 19.

The decoder 13, which decodes the states of the shift register 12 within any of its cycles, comprises logic NAND gates 40 to 47, and inverters 48 and 49. The inverters 48 and 49 are usually also NAND gates with only one input used. For clarity of description they are mentioned and shown here as inverters.

To demonstrate how the waveform in the uppermost portion of FIG. 2 results, the details of generating the two steps having the voltage $V_1$ will be explained. The value $V_1$ is determined by the voltage divider comprising the resistors 20 and 17, the latter is switched in the divider circuit by the action of the transistor 15. The resistance of the coil I may be ignored if it is high enough compared to the resistor 17, otherwise it has to be taken in parallel with it. The transistor 15 is controlled by, and follows the logical function at the output of the NAND gate 46. The output of the NAND gate 46 is related to the outputs of the shift register 12 stages by the logical function $$Y=\overline{\overline{(\bar{Q}_{30}\cdot\bar{Q}_{32})}\cdot\overline{(Q_{31}\cdot\bar{Q}_{32})}}$$

The first bracket represents the output of the NAND gate 45, and the second bracket represents that of the NAND gate 41. Both the NAND gates 41 and 45 are applied to the NAND gates 46, which drives the transistor 15. The above function may be simplified by De Morgan's law and reordering to yield the simple form $$Y=\bar{Q}_{32}\cdot(Q_{31}+\bar{Q}_{30}).$$

The truth table for the above function as it varies with the first 12 clock pulses is shown in Table I following:

TABLE I

| Clock Pulse Sequence | $\bar{Q}_{30}$ | $Q_{31}$ | $\bar{Q}_{32}$ | y |
|---|---|---|---|---|
| 1 | 0 | 0 | 1 | 0 |
| 2 | 0 | 1 | 1 | 1 |
| 3 | 0 | 1 | 0 | 0 |
| 4 | 1 | 1 | 0 | 0 |
| 5 | 1 | 0 | 0 | 0 |
| 6 | 1 | 0 | 1 | 1 |
| 7 | 0 | 0 | 1 | 0 |
| 8 | 0 | 1 | 1 | 1 |
| 9 | 0 | 1 | 0 | 0 |
| 10 | 1 | 1 | 0 | 0 |
| 11 | 1 | 0 | 0 | 0 |
| 12 | 1 | 0 | 1 | 1 |

In this particular embodiment the use of NPN transistors implies positive logic, so that the transistor 15 will be switched on whenever the output of the NAND gate 46, as represented by the function Y, is in the logical "1" state. As can be seen from Table I together with the uppermost curve of FIG. 2, the transistor 15 will be switched on during the second, sixth, eighth, 12th and so fourth, clock pulses, causing the point 19 in FIG. 1 to have a potential $V_1$ during those clock pulses. Other steps of the waveform are produced similarly by the action of the remaining transistors 14 and 16.

As for generating the waveform shown in the middle portion of FIG. 2, which waveform is shifted three steps relative to the uppermost waveform; it suffices that the resistor 17', controlled by the transistor 15', which is also connected to the output of the NAND gate 46, be of such value as to produce a voltage $V_2$ instead of $V_1$ at the corresponding point 19'. Other steps of that waveform, again, are produced in a similar manner.

The inverter 48 controls the transistor 14, which causes substantially ground potential to appear at point 19 when switched on. This corresponds in the uppermost curve of FIG. 2 to that first, seventh, 13th and so forth, clock pulses. Similarly, the transistor 14' causes the point 19' to be grounded, which in the middle curve of FIG. 2 corresponds to the fourth, 10th and so forth, clock pulses.

Clearly the choice of the number of approximation steps of a repetitive waveform is arbitrary and depends on the number of stages of the shift register 12. Also, the value of the voltage at each approximation step is arbitrary, and it is these values that determine the waveform. For example, in approximating a given analog waveform it is meaningful to set the value of each approximation step equal to the mean value of the analog waveform taken over the duration of the corresponding approximation step. The choice of the number of approximation steps may also depend on the particular application of the waveforms.

The frequency of the digital waveforms $f_w$ is determined by the clock pulse frequency $f_c$, and the number of stages n of the shift register 12; it is $$f_w=f_c/2\,n$$

In this particular embodiment, in which an approximate sinusoidal current in the coils I and II was required, the direction of the current flow in the coils I and II was reversed every second cycle of the digital wave form by reversing the coils I and II themselves. This was achieved by connecting the coils I and II each in a diagonal of the bridges 21, 21' respectively. Flip flops 22 and 22' control the current flow in each of the bridges 21, and 21', by controlling the transistors 23 to 26 and 23' to 26', respectively. This is a well known technique and the only explanation deemed necessary is how the flip flops 22 and 23' operate to cause the bridges 21 and 21' to change conduction path. Whenever the voltage at point 19 reaches substantially zero, i.e., upon occurrence of the seventh, 13th, and so forth, clock pulses, the inverter 48 causes the flip flop 22 which controls conduction of the bridge 21 to change states. Similarly the inverter 49 causes the flip flop 22' to change its state and switch the conduction path in the bridge 21' causing a current reversal in the coil II upon occurrence of the fourth, 10th, and so forth, clock pulses. The resultant currents in the coils I and II are shown, superposed, in the lowermost portion of FIG. 2, which clearly shows the two superposed waveforms to be 90° out of phase. The special arrangement of the coils I and II described supra, causes a stepwise rotating magnetic field which is approximately constant in magnitude to result in the plane of their axes.

The direction of rotation of the field may be reversed by reversing the terminals of one of the coils I or II. This is equivalent to interchanging any of the connections to the output of either the flip flop 22 or 22', which may be done electronically.

An advantage of such digital control as applied in magnetic bubble technology, is the possibility of moving magnetic bubbles one step at a time, in either direction, with digital accuracy. With analog waveforms this is not very practicable, and not suitable for operation within a digital computer, for example.

The embodiment described herein is believed to be demonstrative of the potential capabilities of the present invention, the utilization of which is clearly not restricted to the field of magnetic bubble devices.

What is claimed is:

1. A circuit for generating a multilevel digital waveform comprising:

a shift register;

clock means for sequentially advancing the state of said shift register, means for decoding a plurality of states of said shift register, and switching means responsive to said decoding means for controlling circuit elements to vary the value of a voltage and/or a current in an electrical circuit, and yield said digital waveform across an intermediate output;

the improvement comprising:

a transistor bridge having one pair of opposite terminals connected across said intermediate output, and the other pair of opposite terminals for connection to a load, and a bistable flip flop responsive to a selected output of said decoding means, for controlling the conduction path in said transistor bridge, thereby altering the current direction through said load upon occurrence of a change in state of said flip flop.

2. A circuit as defined in claim 1 wherein said switching means comprises a plurality of transistors connected at one terminal of their conduction path to a first common point and at the other terminal each to one terminal of a resistance, the other terminal of each of said resistances is connected to a second common point, said resistances being said controlled circuit elements, and said first and second common points are connected in a current path to develop said digital waveform thereacross.

* * * * *